April 15, 1952  O. H. SHENSTONE  2,592,752
SEAL FOR AXIAL AIR GAP INDUCTION MOTORS
Filed Jan. 17, 1949
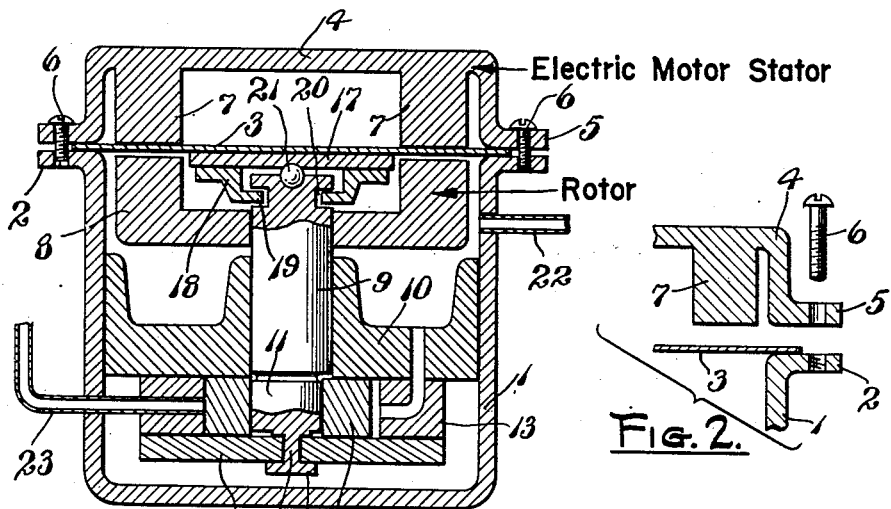
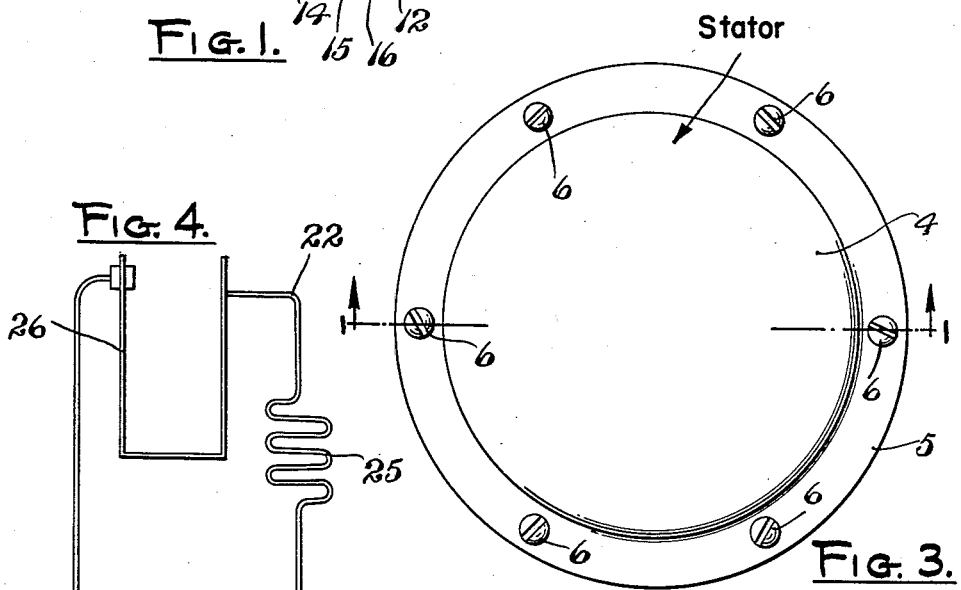
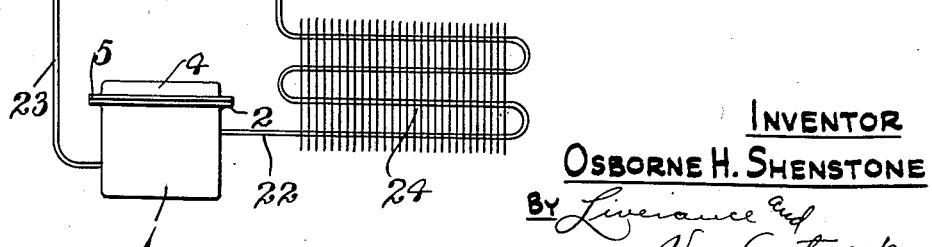
INVENTOR
OSBORNE H. SHENSTONE
BY
ATTORNEYS Patented Apr. 15, 1952

2,592,752

UNITED STATES PATENT OFFICE 2,592,752

SEAL FOR AXIAL AIR GAP INDUCTION MOTORS

Osborne H. Shenstone, Muskegon, Mich.

Application January 17, 1949, Serial No. 71,384

4 Claims. (Cl. 172—36)

This invention relates to a novel, practical and very useful improvement for sealing the air gap in induction electric motors. Such air gap is between the rotor and the stator of the motor, which are located in a face to face relation, and between the faces of which a narrow gap or air space exists.

The place where my invention is of great value is in connection with the compressor of a refrigerating system, the rotor and the pump for the compressor being within a sealed chamber, and the stator being connected to a side of the housing outside of a diaphragm which completes such chamber. A thin metallic diaphragm is used to close and seal such chamber, being located between the rotor and the stator in the space or air gap between them. Such a diaphragm is hermetically sealed in position and is subjected to the varying pressures generated in the sealed chamber into which the fluid refrigerant enters and from which it is forcefully pumped.

It is an object and purpose of the present invention to provide a novel, and very practical and useful insurance against such diaphragm, located between the rotor and stator, being distorted and pressed outward or inward as an effect of the variations in pressure from atmospheric pressure, which occur within the sealed chamber; and at the same time detachably secure the stator to the chamber housing and at the outer side of the diaphragm. Thus, with the stator in place, the electric motor is complete and operable, but if for any reason, the coils or windings of the motor, which are a part of the stator, need repair, replacement, or other attention, the stator may be detached and the diaphragm insured against deformation or other strain because of pressure variations within the chamber. An economical, simple and practical, novel construction of a particularly useful nature is provided, and one of particular utility in mechanical refrigeration, though not to be considered as restricted as to use.

An understanding of the invention may be had from the following description, taken in connection with the accompanying drawing, in which, Fig. 1 is a central longitudinal section through the motor, pump and sealing diaphragm, substantially on the plane of line 1—1 of Fig. 3.

Fig. 2 is a fragmentary, similar section showing the stator disconnected.

Fig. 3 is a plan view of the structure as shown in Fig. 1 and,

Fig. 4 is a diagrammatic disclosure of a refrigerating system in which my invention may be used.

Like reference characters refer to like parts in the different figures of the drawing.

In the construction shown, a housing 1, preferably of cylindrical form, is formed with a closed end and an open end, at the open end having an outwardly extending continuous flange 2. A diaphragm 3 of thin metal is located across the open end and extends at its edge portions partly over the flange 2, to which it is permanently secured by a hermetically sealed connection.

A stator 4, in the form of a shallow inverted cup, has an outwardly extending flange 5 of the same diameter as the flange 2, the two flanges being detachably connected by means of screws 6. The stator when assembled in place bears against the edge portions of the diaphragm 3 at its upper side (Fig. 1) and may be so constructed as to bear against or contact the diaphragm in its central portion. The stator, which may be of conventional structure in an induction electric motor, includes a core 7, the windings of the motor (not shown) being conventional and connected in association therewith, the detail of the structure of which is not a part of the present invention. The lower ends of the core 7 come substantially against the upper side of the diaphragm 3.

The rotor 8 of the motor is located within the chamber surrounded by the housing 1 and the diaphragm 3, and is immediately below the underside of the diaphragm, spaced a short distance from it and does not touch the diaphragm in its rotative movements. The windings of the rotor (not shown) are conventional. The rotor is fixed on a vertical shaft 9 mounted for rotation in a bearing support 10 secured permanently within and across the housing 1. At its lower end an eccentrically off-set portion 11 is provided and operatively associated with a pump rotor 12. The pump rotor 12 is within a housing therefor provided by an angular ring 13 secured at the underside of the bearing 10, and a lower closure plate 14 fastened to the housing ring. The pump structure shown is of a conventional type, the rotor 12 turning within the pump chamber provided by the housing around it and with a radial vane slidably therein to follow the inner side of the ring 13.

From the lower end of the offset 11 a projection 15 circular in cross section extends through the plate 14 and has a head 16 at its lower end of a greater diameter than the opening of the plate 14 through which the projection 15 passes. The axis of the part 15 is in alignment with and an extension of the axis of the shaft 9.

The motor rotor 8 at its upper side is recessed as shown, and at the underside of the diaphragm 3 an annular plate 17 is securely connected, the diameter of which is slightly less than the diameter of the recess in the rotor. At the underside of the plate 17 a ring 18 is connected and provided with a lip 19 at its lower side around the central opening in the ring. Such lip 19 enters an annular groove 20 in the upper end portion of the shaft 9 and an anti-friction thrust bearing the form of a ball 21 is located between the upper end of the shaft 9 and at the lower side and centrally of the plate 17. The width of the groove 20 is a few thousandths of an inch greater than the thickness of the lip 19, and there is a tolerance between the lower end of the offset eccentric 11 and the upper side of the plate 14, and between the lower side of the plate 14 and head 16. Upward thrust of the shaft 9 is carried solely by the ball 21, and downward thrust of the shaft by the lower end of the offset eccentric 11.

One place of use where the electric motor and pump structure described is of particular utility is in connection with refrigerator systems. The motor and pump provides the compressor, the refrigerant entering the chamber within the housing 1 through an inlet pipe 22, and being forcibly pumped therefrom through an outlet pipe 23 connected with the pumping housing as shown in Fig. 1. In the pipe line 22 a condenser 24 and restrictor 25 are included located between the compressor and the evaporator 26, the pipe line 23 leading to one side of the evaporator and the pipe line 22 away from the other side.

In operation, should the pressure within the enclosed chamber exceed atmospheric pressure at any time, either with the stator assembled in place or removed, outward deflection of the diaphragm is guarded against by the annular lip at 19 coming against the underside of groove 20, and a stopping of outward deflecting movement of the diaphragm by head 16 being pulled against the underside of plate 14. On lowering pressure within the chamber below the outside pressure plate 17 is against the ball 21 and the end of the offset extension 11 will be stopped against the upper side of plate 14. Thus the diaphragm is held within movements, inward or outward, to a very small fraction of an inch insufficient to permanently distort the diaphragm.

When the motor is running, any inward deformation of the diaphragm by an excess of outside pressure over inside pressure will be less than the distance between the inner side of the diaphragm and the outer portion of the motor rotor 8. Thus in any condition of operation that may occur, the diaphragm is safeguarded against damage, the chamber remains sealed intact, and the stator is always readily removed by merely withdrawing the screws 6.

The structure is an electric motor operated pump which while of great utility in refrigeration may also be used for any type of fluid pumping wanted, either where the fluid is entirely liquid or entirely gaseous or any mixture of both. All variations of pressure between the inside of the chamber and the outside are provided for and the motor repair which in almost if not in entirely all cases in connection with the stator is facilitated, made easy through the novel and particularly economical structure which I have invented.

The invention is defined in the appended claims and is to be considered comprehensive of all forms of structure coming within their scope.

I claim:

1. In a structure of the class described, a a hollow housing having walls, closed at one end, a flexible diaphragm across and closing and sealing the other end of the housing, a rotor of an axial air gap induction motor and a shaft therefor located within said housing with the rotor in close proximity to the inner side of the diaphragm, means for rotatably mounting the shaft, a stator of an axial air gap motor detachably secured to said housing at the outer side of said diaphragm, means for limiting the longitudinal movement of said shaft, and interlocking means within the housing connecting the shaft with the diaphragm comprising a relatively rigid plate of metal secured to the inner side of the diaphragm, a ring secured to the inner side of said plate, said shaft extending at its adjacent end into said ring centrally thereof toward said plate, said shaft having an annular groove adjacent said end and said ring having an annular flange extending into said groove, providing an interlocking connection between the shaft and diaphragm limiting inward or outward flexing of the diaphragm due to variations of pressure within the housing.

2. A structure as defined in claim 1, and an anti-friction thrust bearing between said end of the shaft and the inner side of said plate.

3. In a structure as described, a hollow housing having walls closed at one end, a flexible diaphragm across the other end of the housing closing and sealed to said end thereof, a shaft in the housing lengthwise thereof, a bearing for said shaft secured to the housing, a rotor of an axial air gap induction motor secured to said shaft between the bearing and diaphragm, said rotor closely approaching the inner side of the diaphragm, a pump secured to said bearing between the bearing and the closed end of the housing, operably associated with the shaft, the shaft extending through the pump housing toward the closed end of said first mentioned housing and connected therewith to hold the shaft substantially against longitudinal movement, means secured to the inner side of the diaphragm and extending therefrom into said rotor, said rotor being centrally recessed to receive said means, said means having an interlocking connection with the adjacent end of the shaft thereby limiting inward or outward flexing of said diaphragm through variations of pressure above or below atmospheric pressure within the first mentioned housing, said interlocking connection comprising a rigid plate secured to the inner side of the diaphragm, a ring like means secured to the inner side of the plate into which the adjacent end of said shaft extends, said shaft having an annular groove around its said adjacent end, and said ring like means having a flange extending into the groove, a stator of an axial air gap motor located at the outer side of the diaphragm and means for releasably connecting the stator to the housing at its open end, said stator covering the diaphragm and clamping its peripheral margin against the housing.

4. A construction as defined in claim 3 and an anti-friction ball axially located at the end of the shaft, between it and said plate.

OSBORNE H. SHENSTONE.

REFERENCES CITED

The following references are of record in the file of this patent:

UNITED STATES PATENTS

| Number | Name | Date |
| --- | --- | --- |
| 592,244 | Fay | Oct. 26, 1897 |
| 1,233,569 | Graemiger | July 17, 1917 |
| 2,245,577 | Dieckman | June 17, 1941 |
| 2,481,172 | Staggs | Sept. 6, 1949 |